(12) United States Patent
Le

(10) Patent No.: US 6,908,123 B2
(45) Date of Patent: Jun. 21, 2005

(54) BAYONET QUICK COUPLER

(75) Inventor: Tuan Le, Diamond Bar, CA (US)

(73) Assignee: Fluidmaster, Inc., San Juan Capistrano, CA (US)

( * ) Notice: Subject to any disclaimer, the term of this patent is extended or adjusted under 35 U.S.C. 154(b) by 263 days.

(21) Appl. No.: 10/014,117

(22) Filed: Oct. 26, 2001

(65) Prior Publication Data
US 2002/0093199 A1 Jul. 18, 2002

Related U.S. Application Data
(60) Provisional application No. 60/244,076, filed on Oct. 27, 2000.

(51) Int. Cl.$^7$ ................................................ F16L 21/00
(52) U.S. Cl. ........................ 285/402; 285/921; 285/419
(58) Field of Search ................................. 285/401, 402, 285/28, 337, 361, 360, 914, 373, 419, 921, 364

(56) References Cited

U.S. PATENT DOCUMENTS

| 437,915 | A | | 10/1890 | Costigan | |
|---|---|---|---|---|---|
| 925,316 | A | | 6/1909 | Elbert | |
| 1,350,073 | A | | 8/1920 | Dow | |
| 1,725,713 | A | | 8/1929 | Jobe | |
| 3,480,300 | A | | 11/1969 | Jeffrey et al. | |
| 3,498,642 | A | | 3/1970 | Berger | |
| 4,226,164 | A | * | 10/1980 | Carter | ........................ 411/433 |
| 4,452,097 | A | * | 6/1984 | Sunkel | ........................ 74/502.4 |
| 4,478,440 | A | | 10/1984 | Koch et al. | |
| 5,007,666 | A | | 4/1991 | Kyfes | |
| 5,326,036 | A | * | 7/1994 | Wilger | ........................ 239/600 |
| 5,620,210 | A | * | 4/1997 | Eyster et al. | .................. 285/81 |
| 5,775,744 | A | | 7/1998 | Smith, III | |
| 5,937,885 | A | * | 8/1999 | Sampson | ........................ 137/1 |
| 6,102,448 | A | * | 8/2000 | Fixemer et al. | .............. 285/330 |

FOREIGN PATENT DOCUMENTS

GB  771968  * 4/1957  ................. 285/914

* cited by examiner

Primary Examiner—Gregory J. Binda
Assistant Examiner—Aaron Dunwoody
(74) Attorney, Agent, or Firm—Myers Dawes Andras & Sherman LLP; Vic Lin

(57) ABSTRACT

A quick coupler formed of two identical sectors that snap lock together in a radially inward direction relative to a central axis of an annular hole passing through the coupler. The coupler is in the form of a nut or housing for surrounding the ends of two conduits that are to be coupled. The annular hole extends between opposite end faces and has structure near each end face. The structure at one end of the annular hole comprises a flange for retaining a first conduit when the sectors are snapped surroundingly snapped together on the end of the first conduit. The structure at the other end of the annular hole has circumferentially spaced lugs for cooperation with bosses on the second conduit in a bayonet quick coupling fashion. The combination of the coupler with first and second conduits having cooperating structure enabling the coupler to join the conduits in sealed fluid communication. The method of use of the combination comprises snap fitting the sectors onto an end of the first conduit by radially inward pressure.

12 Claims, 5 Drawing Sheets

BAYONET QUICK COUPLER

RELATED APPLICATION

This application claims priority from U.S. patent application No. 60/244,076 filed Oct. 27, 2000 entitled "Bayonet Quick Coupler".

BACKGROUND OF THE INVENTION

1. Field of the Invention

This invention relates to end fittings and more specifically to end fittings adapted for coupling fluid conduits.

2. Disclosure of the Prior Art

Conventionally, a fluid conduit is coupled to a valve body or another fluid conduit by a threaded connector or a split-ring lock system. Both of these systems have disadvantages. For example, the split-ring lock system cannot provide a completed support around the circumference of the coupler. Furthermore it requires special tools to assemble and disassemble the ring.

Threaded couplers require an inordinate amount of time to assemble. They also have a high propensity to damage, for example by cross threading and inappropriate tightening. In a threaded coupler design, a coupling nut may be used to attach a fluid conduit assembly to a valve body. The size of the nut is controlled by the largest diameter of the conduit over which the nut must slide. In another application, when a nut cannot slide axially along the conduit, a conventional system requires use of a retaining ring to hold the nut on the conduit. In this case, if the retaining ring is permanently attached, then destruction of the ring and possibly a segment of the conduit must occur in order to remove the nut.

SUMMARY OF THE INVENTION

These disadvantages of the past are overcome with the present invention that provides an end fitting that can be quickly and easily attached to and detached from an assembly such as a valve body. Minimum effort is required and no special tools are needed. Damage to delicate screw threads, due to cross threading or inappropriate tightening, is avoided. The fitting can be attached without sliding it along the conduit and no separate retaining ring is required to hold it in place. In order to achieve these advantages, the bayonet quick coupler of the present invention has several objects.

Firstly, the quick coupler is in the form of a nut or housing for surrounding the respective ends of two adjacent conduits to couple the conduits together. The quick coupler has an annular hole extending between end faces of the nut or housing. Inner structure of the annular hole at an end near one face is for receiving one conduit, and inner structure of the annular hole at an end near the other face is for receiving the other conduit. One of the end structures is designed to surround a radially outwardly extending flange on one of the conduits. The other of the end structures is configured to receive bosses of the other conduit in a bayonet axial and radial action for bayonet twist and lock connection of one conduit to the other. While bayonet type quick couplers are known in the prior art, the specifics of the end structures of the instant invention may well be unique by themselves.

Secondly, the coupler has a plurality of pieces or sectors. These sectors are fit together to form the nut or housing. Specifically, the instant invention has two sectors although it could have more than two. The plurality of sectors are identical in shape and size. The sectors fit together along mating parts of the sectors that are complementary to each other. The parts fit together when like surfaces of the two sectors are diametrically opposite each other relative to the annular hole that is formed by the sectors.

Thirdly, the sectors of the nut are sufficiently resilient and move radially inwardly to a snap lock configuration in which they are adapted to surround the end of a first of the conduits.

Fourthly, each sector of the coupler has flanges that extend radially inwardly to block axial movement of a mating sector when assembled in a snap lock configuration. In general, a stopping flange is located at an end face of each of the sectors and engages an end face of another of the sectors to prevent relative axial movement between the sectors in first and second axial directions. In the preferred embodiment, each sector has an additional stopping flange also preventing relative axial movement as well as some radial movement between the sectors.

Fifthly, the sectors have one radially inwardly extending rib forming an inwardly facing channel, and one radially outwardly extending rib forming an outwardly facing channel. An inwardly oriented rib and channel of one sector mates with an outwardly oriented rib and channel of another sector to inhibit relative radial movement of the sectors in a plurality of directions. The conduit(s) further limits radial movement of the sectors in the remaining radial directions when the sectors are in the snap lock configuration surroundingly coupled to the conduit(s).

Sixthly, the sectors each have axially extending flanges that have sockets thereon. These sockets are positioned to engage a protrusion supported on the conduit having bayonet bosses such that protrusion(s) on the conduit will engage the sockets and lock the nut in the bayonet locked position.

These and other objects of the invention will become more apparent with the following description of the preferred embodiments and reference to the associated drawings.

PREFERRED EMBODIMENTS

Figure 1:
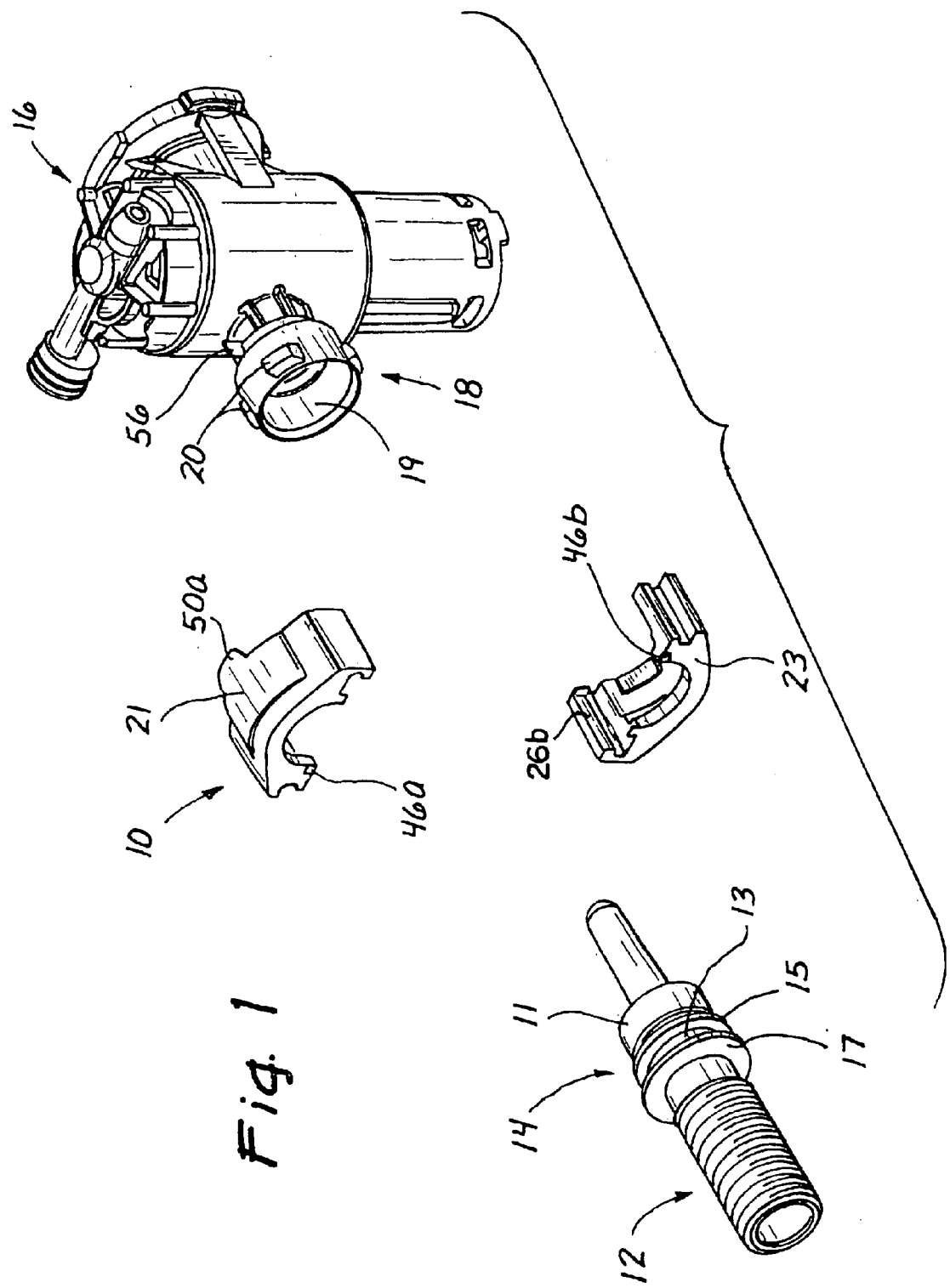
FIG. 1 is an exploded perspective view of the coupler and the two conduits.

A first preferred embodiment of the quick coupler of the present invention is illustrated in FIG. 1 and designated by the reference numeral 10. This coupler 10 in the illustrated environment provides a device for coupling a shank assembly 12 to a valve assembly 16. The shank 12 has a first conduit 14. The valve assembly 16 has a second conduit 18 with a coupling 19 of the second conduit 18. The first conduit 14 is adapted for coupling to the second conduit 18 by the coupler 10.

Figure 2:
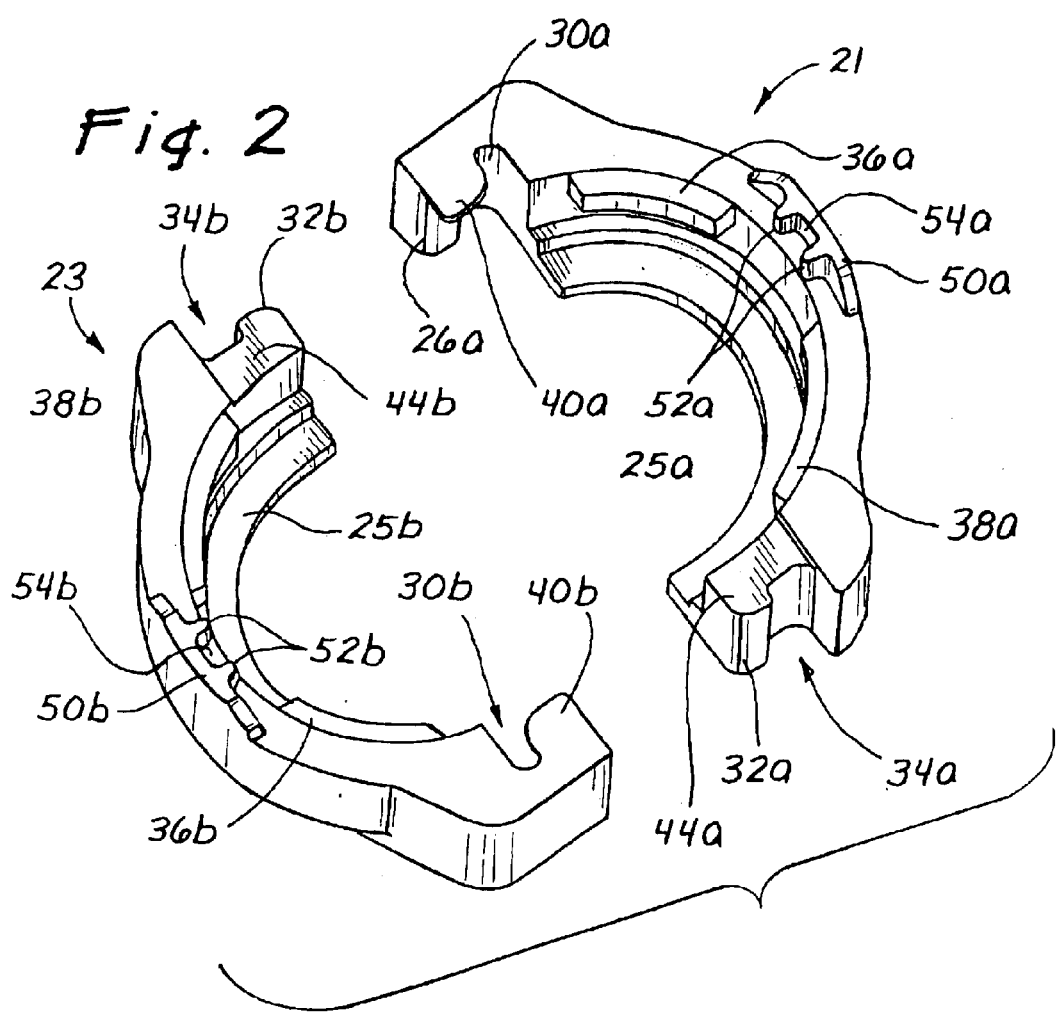
FIG. 2 is an exploded perspective view of the coupler.

The quick coupler 10 in this embodiment comprises two identical pieces or sectors 21 and 23 that combine to form a nut as shown in FIG. 2. Thus, the sectors 21 and 23 cooperate to form the single quick coupler 10 in the form of a nut or housing which connect the conduit 14 of the shank assembly 12 to the conduit 18 of the valve body 16, as shown n FIG. 5. The coupler 10 has opposite end faces and a annular hole extending along a central axis between the opposite end faces of the coupler. In the preferred embodiment, the two pieces form sectors 21, 23 of a nut. The sectors 21, 23 together form an annular hole for surrounding ends of the two conduits 14, 18. The sectors 21, 23 have respective axial ends adjacent end faces of the nut for surrounding the ends of the two conduits. In the operative environment, one of the conduits, in this case the conduit 14, may have an annular flange 15, while the other conduit, such as the conduit 18, may be provided with the shape of a cylinder having a plurality of lugs 20 extending radially from its outer surface. It will be apparent that this same quick coupler 10 can be advantageously used to connect any two conduits with ends similar to those of the conduits 14 an 18.

Since the sectors 21 and 23 are identical in this embodiment, their similar parts will be designated by the same reference numeral followed by the lower case letter "a" for the sector 21 and the lower case letter "b" for the sector 23. Referring now to FIG. 2, the sector 21 has an inwardly extending semi-annular lip 25a that is similar to a semi-annular lip 25b for the sector 23.

The sectors 21, 23 have structure for preventing relative radial movement between the sectors 21, 23. At one end of the sector 21, an inwardly extending rib or tongue 26a forms an inwardly facing channel or groove 30a. At the opposite end of the sector 21, an outwardly extending rib or tongue 32a forms an outwardly facing channel or groove 34a. In a similar manner, the sector 23 includes ribs or tongues 26b and 32b that form channels or grooves 30b and 34b, respectively. Tongues 26a, 26b and 32a, 32b are in the form of ribs in the present invention, and the grooves 30a, 30b and 32a, 32b are in the form of channels. However, any of a variety of structures providing a tongue and groove relationship is within the scope of the invention. In the present invention, the tongues 26a, 26b and 32a, 32b define the grooves 30a, 30b and 34a, 34b between the tongues and the main bodies of the respective sectors 21, 23.

With the coupler formed as the two sectors 21, 23 facing each other in a radially inward direction of the annular hole that they form, an end of the first sector 21 is located at 180 degrees from an identical end of the second sector 23. The channel formed by groove 30a at a first end of the first sector 21 lockingly engages the channel formed by groove 34b at the second end of the second sector to prevent relative movement of the sectors in a plurality of radial directions. In fact, the ribs prevent relative radial movement of the two sectors through at least 180 degrees of a radial arc.

In the combination further described below, it can be seen that one or both of the conduits will further limit relative movement of the sectors 21, 23 in the remaining radial directions when in the snap lock configuration.

The sectors 21, 23 have structure for blocking relative axial movement. The structure for blocking relative axial movement is provided by radially inwardly extending stop flanges 40a, 40b and 42a, 42b. The respective stop flanges 40a, 40b and 42a, 42b of one sector fit in recesses 44b, 44a and 46b, 46a of the other sector 21, 23.

In the combination further described below, a single stopping flange 40a, 40b on each sector 21, 23 is sufficient to stop relative axial movement in both directions because of the conduit(s) to which the sectors 21, 23 are coupled. However, the second set of radially inwardly extending stop flanges 42a, 42b add redundancy and secure the sectors 21, 23 against relative axial movement in the snap lock position even when the sectors are not surrounding conduit(s).

One aspect of the invention of special interest is that the pieces making up the sectors 21, 23 are identical in shape and size, and that the mating surfaces are two identical pairs of complimentary mating surfaces. The sectors 21, 23 are separably joined along the complimentary mating surfaces. Furthermore, the structure for preventing or blocking relative radial and axial movement between the sectors is provided by the complimentary mating surfaces. In this manner, ribs 32a and 32b act as a set of lines parallel t the annular hole. The complimentary mating surfaces have a portion defined by a set of lines parallel to the axis of the annular hole and a portion perpendicular to the axis. The portion of the mating surfaces defined by lines parallel to the axis prevents relative movement of the sectors in a plurality of radial directions, and the portion of the mating surfaces that is perpendicular to the axis prevents relative movement of the sectors in a plurality of axial directions when the sectors are assembled together.

When the sectors 21 and 23 are snapped together, they form a single annular hole. The Semi-annular lips 25a and 25b form a single radially inwardly extending annular flange. This flange is intended to be disposed outwardly of the annular flange 15 associated with first conduit 14. The inwardly extending annular flange is located at one end of the portions or the sectors 21, 23 defining the annular hole for retaining the outwardly extending flange 15 of the first conduit.

Figure 3:
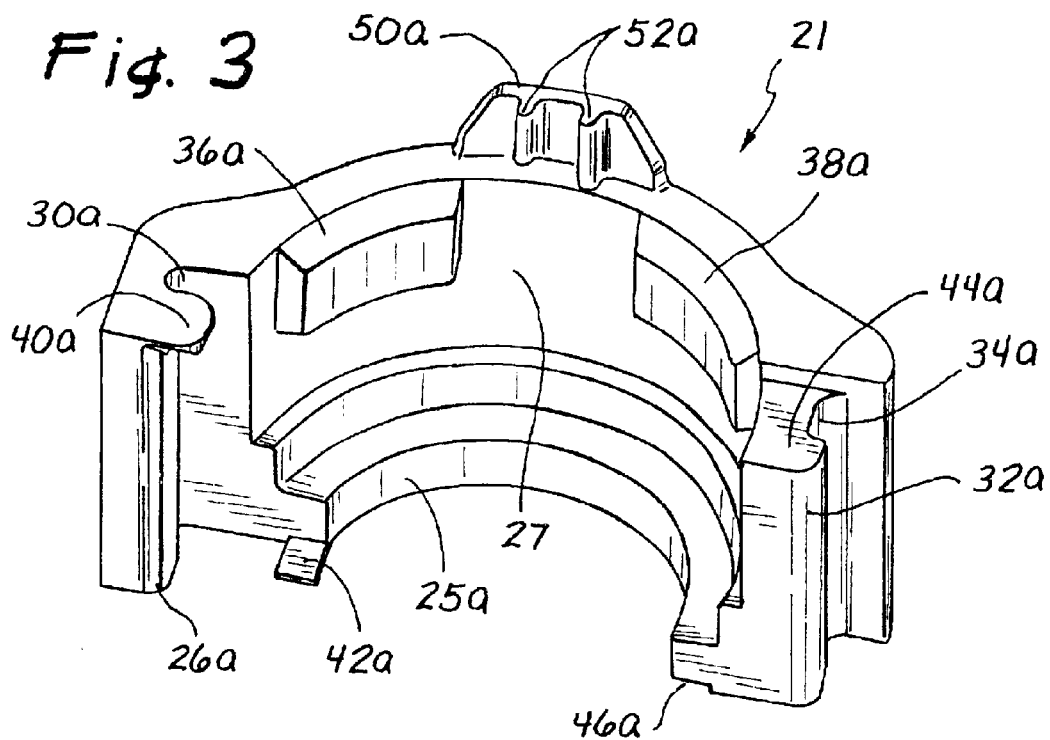
FIG. 3 is a perspective view showing the interior of one coupler sector.
Figure 4:
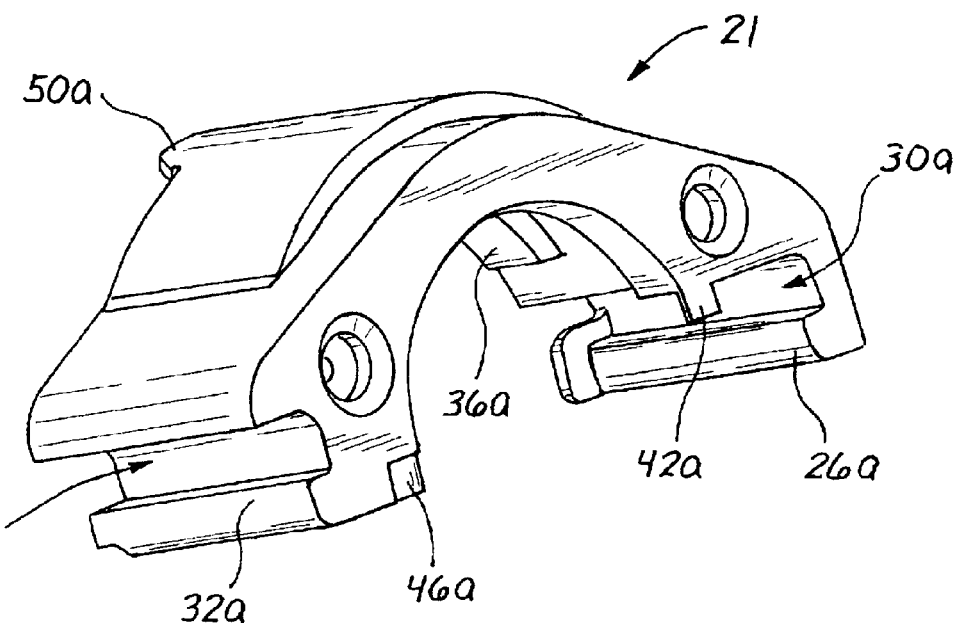
FIG. 4 is a perspective view of a coupler sector showing ribs and channels.

The sector 21 also includes at least one lug 36a and preferably a second lug 38a, which extend circumferentially and inwardly. The sector 23 in this embodiment also includes lugs 36b and 38b. The sector 21 also includes at least one lug 36a and preferably a second lug 38a, which extend circumferentially and inwardly. The sector 23 in this embodiment also includes lugs 36b and 38b. The coupler 10 forms an annular hole comprising a first inner diameter at 27 in FIG. 3, the lugs 36a, 38b having a second inner diameter, and the flange formed of semi-annular lips 25a and 25b having a third inner diameter. The first diameter is greater than the second diameter, and the second diameter is greater than the third diameter.

The quick coupler 10 comprises a nut having an annular hole for rotational retention on the first conduit 14, and lugs protruding radially inwardly on the portions or the sectors defining the annular hole for sliding past the bosses of the second conduit in a bayonet twist action. The coupler 10 has locking flanges 50a, 50b protruding axially from end faces of the coupler 10. The locking flanges 50a, 50b have sockets 54a, 54b adapted to engage a protrusion 56 on the second conduit 18 for bayonet lock action. The axially extending flanges 50a, 50b have a plurality of axially extending ribs 52a, and a plurality of axially extending ribs 52b forming sockets 54a, 54b between each plurality of ribs for receiving the protrusion 56 on the second conduit. It should be understood that the sockets 54a, 54b and protrusion 56 may be of any of a variety of forms.

In the combination further described below, a plurality of protrusions may be provided extending radially outwardly from the second conduit 18. Preferably, conduit 18 will have a number of protrusions 56 equal to or greater than the number of axially extending flanges, with the protrusions 56 arranged so that each socket will be aligned with a protrusion in the bayonet locked position.

It is particularly advantageous that the sectors 21 and 23 can be snapped together over the conduit 14 so there is no requirement for a nut to be slid axially along the conduit. However, once the sectors 21 and 23 are snapped together, they form a nut with bayonet lugs to secure the conduit 14 of the shank assembly 12 to the conduit 18 of the valve body 16. Accordingly, a quick and simple assembly is provided which can be inexpensively mass produced as a single component, and which can be assembled without the use of special tools. The resulting construction is illustrated in the perspective view of FIG. 5.

A second preferred embodiment includes the combination of the conduits 14, 18 and the coupler 10. The coupler 10 has the plurality of sectors 21, 23 that snap lock together with the portions or the sectors defining the annular hole surrounding the first conduit and being retained thereon by interference between radially outwardly extending flange 15 of the conduit and the inwardly extending annular flange formed by semi-annular lips 25a, 25b. Preferably the first conduit 14 has a second outwardly extending flange 17 further from the end of conduit 14 to be coupled. This second flange 17 advantageously locates the coupler 10 properly for coupling with the second conduit and prevents axial movement of the coupler 10 along the first conduit 14. In one embodiment of the first conduit 14, the second flange 17 has a larger diameter than the first flange 15 and acts to locate and support the first conduit 14 on a support structure. Otherwise, the first and second flanges 15, 17 may have similar sized diameters.

The lugs 36a, 36b, 38a, and 38b are disposed around the coupler 10 with a spacing complimentary to the lugs 20 on the connector of conduit 18. This configuration enables the quick coupler 10 to engage the second conduit 18 thereby providing for sealing engagement of the conduit 14 with the conduit 18.

Figure 6:
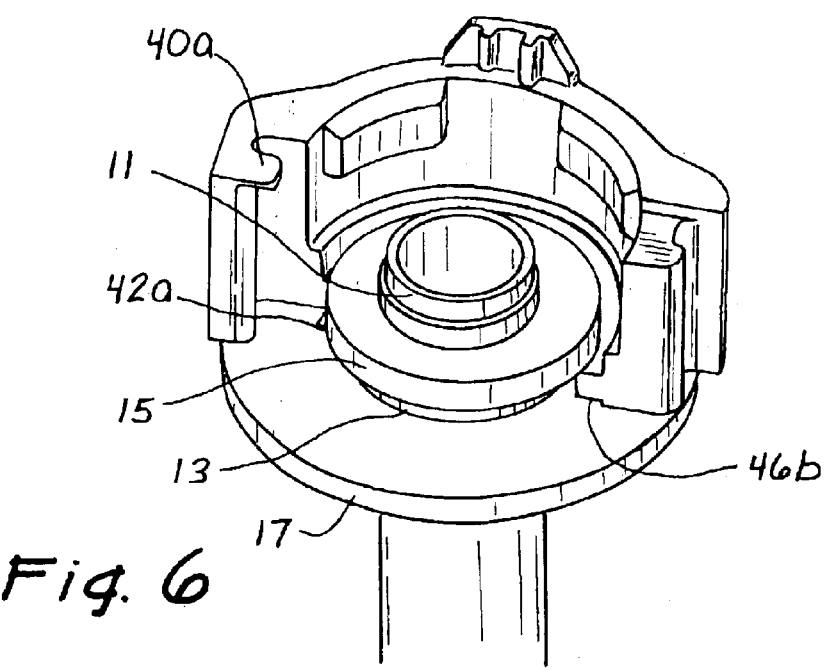
FIG. 6 is a perspective view of one coupler sector placed on the first conduit for subsequent snap lock action with another coupler sector.

Describing this combination more specifically, the first conduit 14 has a first diameter. The first conduit 14 has a first radially outwardly extending flange 15 having a second diameter and a second radially outwardly extending flange 17 having a third diameter. The second outwardly extending flange 17 is axially spaced from the first outwardly extending flange 15. The first diameter of the first conduit is measurable between the first and second flanges 15, 17, as shown in FIGS. 1 and 6. The coupler 10 includes an portions or the sectors defining the annular hole having the first diameter and the smaller third diameter with the first diameter of the annular hole being greater than the second diameter of the first outwardly extending flange 15. The third diameter of the annular hole is greater than the first diameter of the first conduit 14 in order to permit radial and axial movement of the coupler over the first conduit 14. The third diameter of the annular hole is less than the second diameter of the first outwardly extending flange 15 and less than the third diameter of the second outwardly extending flange 17. The smaller size of the third diameter prohibits movement of the portions or the sectors defining the annular hole axially along the first conduit 14 over either of the first outwardly extending flange 15 and the second outwardly extending flange 17. The coupler 10 and the annular hole are formed by at least the two sectors 21,23 radially compressible into a snap fit relationship with at least portions of the sectors defining the annular hole disposed between the first outwardly extending flange 15 and the second outwardly extending flange 17 of the first conduit 14. Thus, the coupler is moveable over and together with the first outwardly extending flange 15 to engage the second conduit 18.

Figure 5:
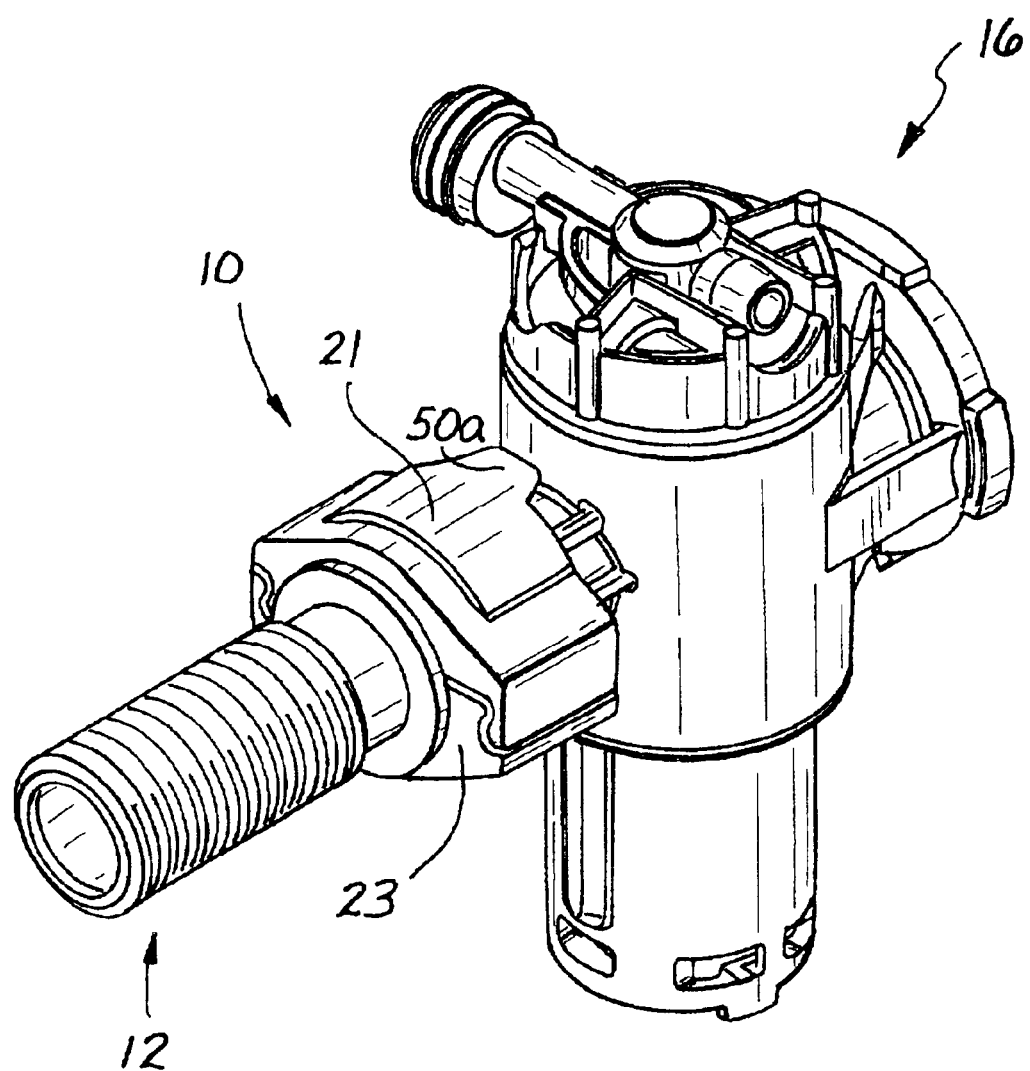
FIG. 5 is a perspective view of the coupler and the conduits in a coupled configuration.

In the particular environment of FIGS. 1 and 5, the first conduit 14 comprises a first pipe having a first end with an annular space defined between a first annular flange 15 and a second annular flange 17. The first annular flange 15 has a diameter greater than the diameter of the annular space. The second conduit 18 comprises a second pipe having a second end with a first bayonet tube 19 disposed at the second end.

The coupler 10 is a pipe coupler having a wall with an axial bore extending between opposing first and second faces of the wall. The axial bore has a first diameter shown at 27 in FIG. 3. First portions 25a, 25b of the coupler 10 extend radially inwardly into the bore at the first face and define the third diameter. The first portions are semi-annular flanges 25a, 25b having a diameter greater than the diameter of the annular space 13 and less than the diameter of the first flange 15. Second portions of the coupler extend into the bore and form a second bayonet tube by lugs 36a,b and 38a,b, which define a second diameter. The coupler at an operative site has the first portions of the coupler disposed in the space 13 of the first pipe 14. Once coupled to the first pipe 14, the coupler 10 is rotatable to engage the first bayonet tube 19 of the pipe 18 with the second bayonet tube of the coupler 10 and to draw the second end of the second pipe 18 into fluid communication with the first end of the first pipe 14. The coupler 10 is further unique in structure and function in that it is formed in at least two separate parts adapted to be radially snap fit together to form the coupler 10.

The combination of the coupler and conduits is not limited to the bayonet type coupler. For example, the second conduit may have bosses or threads extending radially outwardly on the end of the second conduit to be coupled. Correspondingly, the coupler 10 may have inwardly projecting lugs or threads that couple to the bosses or threads on the end of the second conduit for coupling to the coupler.

The first conduit 14 has a nipple 11 on the end to be coupled. The nipple 11 is also surrounded by the coupler 10 in the snap lock configuration. The nipple has a smaller diameter than the second conduit 18 so that the nipple of the first conduit 14 slides axially within the second conduit 18 and resides there in the bayonet coupled configuration shown in FIG. 5. Advantageously, an o-ring or washer may be located on the nipple 11 sealed fluid communication between the first conduit 14 and the second conduit 18.

It is further contemplated that the combination may take the form of a kit including the coupler and the conduits. In this case, it will be advantageous to designate kits with components for particular retrofit applications or for original manufacture applications in which assembly is facilitated by having all the necessary parts available in one package. For example, FIGS. 1 and 5 show the combination of a supply pipe 14 for a toilet reservoir, the receiving pipe 18 for a toilet reservoir automatic shut-off valve 16, and the coupler 10 formed of two sectors for easy assembly and for coupling of the pipes 14, 18. A kit comprising these elements or others could be used as a retrofit kit or in original manufacture.

Figure 7:
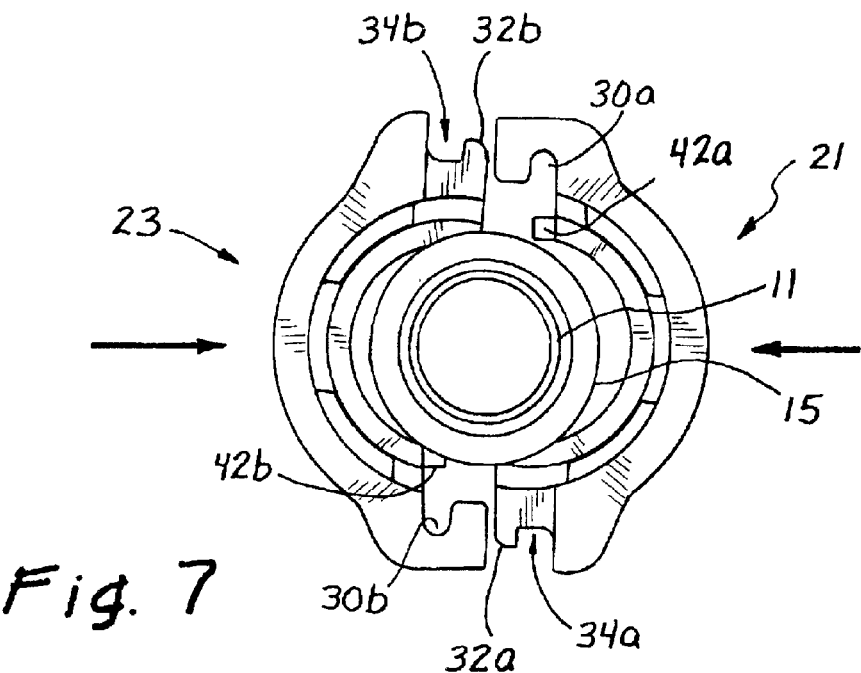
FIG. 7 is an end view of two sectors of the coupler brought into mutual contact surrounding the first conduit.

The present invention also includes a method of using the coupler 10 to join two conduits in sealed fluid communication. In one such method, the coupler 10 is used together with conduits 14, 16 by separating the first and the second pieces or sectors 21, 23 of the coupler sufficiently to receive the first conduit 14. This is exemplified by the placement of one sector on the first conduit as shown in FIG. 6. An outwardly extending flange 15 of the first conduit is then surrounded by the annular hole defined between first and second sectors 21, 23, as shown in FIG. 7. Flexibly forcing the sectors 21, 23 radially inwardly causes them to snap lock together. In this configuration, the first and second sectors 21, 23 of the coupler form a nut or housing and surround the first conduit 14.

Figure 8:
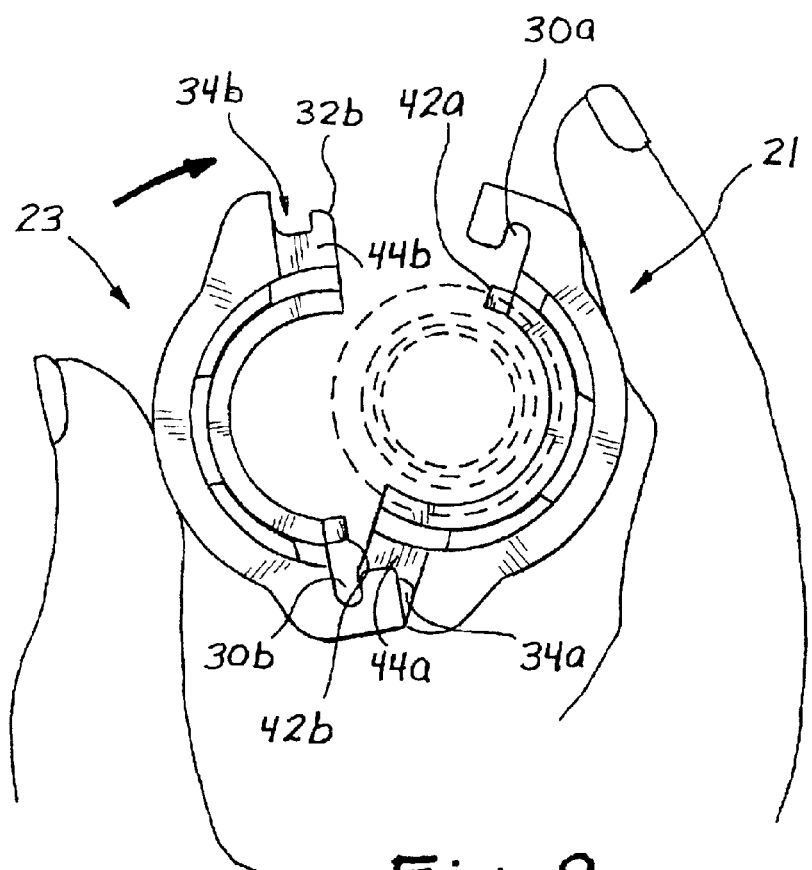
FIG. 8 is an end view depiction of the two sectors of the coupler in a hinged configuration facilitating squeezing by a hand into a snap lock configuration.

As shown in FIG. 8, the step of flexibly forcing the sectors 21, 23 together is optionally achieved by locating a first rib 32a of the first sector 21 in a second groove 30b of the second sector 23. Hinging the first sector relative to the second sector about the first rib 32a radially inwardly brings the first sector 21 into contact with the second sector. Further forcing of the sectors 21, 23 together and snapping a second rib 26a of the first sector into a first groove 34b of the second sector at a location diametrically opposite the first rib 32a and the second groove 30b relative to the annular hole brings the sectors into the snap lock configuration. During the forcing step, the ribs 26a, 32b resiliently slide over each other into a seated position. This optional way of snap locking the sectors 21, 23 facilitates connecting the coupler 10 to the first conduit 14.

After the coupler has been connected to the first conduit in the snap lock configuration, moving the coupler 10 axially and rotationally with respect to the second conduit 18, couples the first conduit to the second conduit. The user accomplishes this specifically by aligning channels between lugs 36a, 36b, 38a, 38b on the wall defined by the annular hole with bosses 20 extending outwardly from the second conduit. Then by moving the lugs axially past the bosses and twisting the coupler, the lugs are moved circumferentially and brought axially in line with and stopped by the bosses from axial movement. Further twisting of the coupler relative to the second conduit until a socket on the coupler engages a protrusion on the second conduit locks the coupler to the second conduit. In this way, the first and second conduits 14, 18 are forced together and held by the coupler.

If for some reason, the coupler 10 needs to be removed from the first conduit after snap locking it thereon, the sectors 21, 23 of the coupler 10 can be separated simply by inserting a sharp blade of a common tool between the mating surfaces of the sectors 21, 23 and prying them apart.

There are many other variations that are within the spirit and scope of this invention. Therefore, the invention is to be limited only by the appended claims.

I claim:

1. A coupler in the form of a housing having opposite end faces, the coupler for joining two conduits together, wherein the coupler comprise:

an annular hole extending along an axis between said opposite end faces of the housing, the annular hole comprising a first inner diameter, lugs having a second inner diameter, and a flange having a third inner diameter, herein the first diameter is greater than the second diameter, and the second diameter is greater than the third diameter;

the housing comprising a plurality of sectors that snap together;

wherein the plurality of sectors each have a rib; and wherein each said rib lockingly engages a respective channel to prevent relative movement of the sectors in a plurality of radial directions.

2. The coupler of claim 1, wherein the sectors are sufficiently resilient to enable snap lock action in a relative radially inward direction between said plurality of sectors.

3. The coupler of claim 1, wherein at least one stopping flange is located at an end face of each of the sectors and engages an end face of another of the sectors and prevents relative axial movement between the sectors in a first and a second axial directions.

4. The coupler of claim 1, wherein each sector has an additional said stopping flange preventing relative movement between the sectors.

5. The coupler of claim 1, wherein each of said plurality of sectors is identical to each other in size and shape.

6. The coupler of claim 1, further comprising a locking flange configured to engage a protrusion on one of the two conduits.

7. The coupler of claim 1, wherein the coupler is secured to at least one of the two conduits by a bayonet twist and lock action.

8. A coupler in the form of a nut having an annular hole extending between end faces and centered on an axis, the coupler being adapted for coupling two conduits together by a bayonet twist and lock action, comprising:

two sectors of the nut defining the annular hole and for surrounding ends of the two conduits by respective axial ends adjacent end faces of the nut;

the sectors being sufficiently resilient to snap lock together;

wherein the sectors snap lock together by relative radially inward movement; and further comprising at least one axially elongated rib forming a radially outwardly facing groove and a another axially elongated rib forming a radially inwardly facing groove on each of the two sectors, wherein the ribs resiliently slide over each other into a seated position during a snap locking action of the two sectors.

9. The coupler of claim 8, wherein each of said plurality of sectors is identical to each other in size and shape.

10. The coupler of claim 8, further comprising a locking flange configured to engage a protrusion on one of the two conduits.

11. The coupler of claim 8, further comprising a stopping flange connected to the another axially elongated rib forming a radially inwardly facing groove at an end thereof, to prevent relative axial movement between the two sectors.

12. The coupler of claim 8, further comprising a lug connected to one of the two sectors, configured to engage one of the ends of the two conduits.

* * * * *